(12) United States Patent
Koneru

(10) Patent No.: US 9,178,877 B1
(45) Date of Patent: Nov. 3, 2015

(54) PROVIDING A SERVICE BASED ON TIME AND LOCATION BASED PASSWORDS

(71) Applicant: Juniper Networks, Inc., Sunnyvale, CA (US)

(72) Inventor: Srikanth Prabhu Koneru, Sunnyvale, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 23 days.

(21) Appl. No.: 14/036,815

(22) Filed: Sep. 25, 2013

(51) Int. Cl.
*H04L 29/06* (2006.01)

(52) U.S. Cl.
CPC .................................. *H04L 63/0846* (2013.01)

(58) Field of Classification Search
CPC ................................................ H04L 63/0846
USPC ............................................................ 726/6
See application file for complete search history.

(56) References Cited

U.S. PATENT DOCUMENTS

| 5,661,807 A | 8/1997 | Guski et al. |
| 7,363,494 B2 | 4/2008 | Brainard et al. |
| 8,285,658 B1 * | 10/2012 | Kellas-Dicks et al. .......... 706/20 |
| 8,856,916 B1 * | 10/2014 | Sobel ............................... 726/17 |
| 2002/0144158 A1 * | 10/2002 | Hekimian ...................... 713/202 |
| 2004/0172535 A1 * | 9/2004 | Jakobsson et al. ............. 713/168 |
| 2006/0048233 A1 * | 3/2006 | Buttross et al. ................. 726/27 |
| 2007/0130472 A1 * | 6/2007 | Buer et al. ..................... 713/182 |

* cited by examiner

*Primary Examiner* — Mahfuzur Rahman
(74) *Attorney, Agent, or Firm* — Harrity & Harrity, LLP

(57) ABSTRACT

A first device may receive a first password from a second device. The first password may be generated based on first time information and first location information identifying a geographic location of the second device. The first device may, determine a second password based on second time information and second location information identifying the geographic location of the second device. The first device may determine that the second device is located at the geographic location at a particular time when characters in the first password match characters in the second password, and may provide a service based on determining that the second device is located at the geographic location at the particular time.

20 Claims, 10 Drawing Sheets

PROVIDING A SERVICE BASED ON TIME AND LOCATION BASED PASSWORDS

BACKGROUND

Time-based passwords can be generated and used to authenticate a client device to access a network, a server, an application, or the like. Time-based passwords may periodically update in order to enhance security such that only authorized client devices may access the network, the server, the application, etc. Verifying a location of a client device for location-based applications may be inaccurate, as the location of the client device can be roughly estimated and may be fraudulently altered.

SUMMARY

According to some possible implementations, a method may include receiving, by a first device, a first password from a second device. The first password may be generated based on first time information and first location information identifying a geographic location of the second device. The method may include determining, by the first device, a second password based on second time information and second location information identifying the geographic location of the second device; determining, by the first device, that the second device is located at the geographic location at a particular time when characters in the first password match characters in the second password; and providing, by the first device, a service based on determining that the second device is located at the geographic location at the particular time.

According to some possible implementations, a first device may receive a first password from a second device. The first password being generated based on information identifying a geographic location. The first device may provide the information identifying the geographic location and information identifying a particular time to a third device; receive, from the third device, a second password based on providing the information identifying the geographic location and the information identifying the particular time; determine that the second device is located at the geographic location at the particular time when characters in the first password match characters in the second password; and provide a service based on determining that the second device is located at the geographic location at the particular time.

According to some possible implementations, a computer-readable medium for storing instructions, may include multiple instructions which, when executed by one or more processors associated with a first device, cause the one or more processors to receive a first password from a second device. The first password may be generated based on first time information and first location information identifying a geographic location of the second device. The multiple instructions may further cause the one or more processors to determine a second password based on second time information and second location information identifying the geographic location of the second device; determine whether the second device is located at the geographic location at a particular time based on whether characters in the first password match characters in the second password; provide a service based on determining that the second device is located at the geographic location at the particular time; and prevent access to the service based on determining that the second device is not located at the geographic location at the particular time.

DETAILED DESCRIPTION

The following detailed description refers to the accompanying drawings. The same reference numbers in different drawings may identify the same or similar elements.

Systems and/or methods, as described herein, may provide a time-based and location-based password. In some implementations, the password may be used to verify a geographic location of a client device at a particular time such that the client device may receive access to a service and/or access to location-based content (e.g., promotions for a merchant located at the geographic location, audio/video content associated with the geographic location, unlocking of a facility, etc.).

Figure 1A:
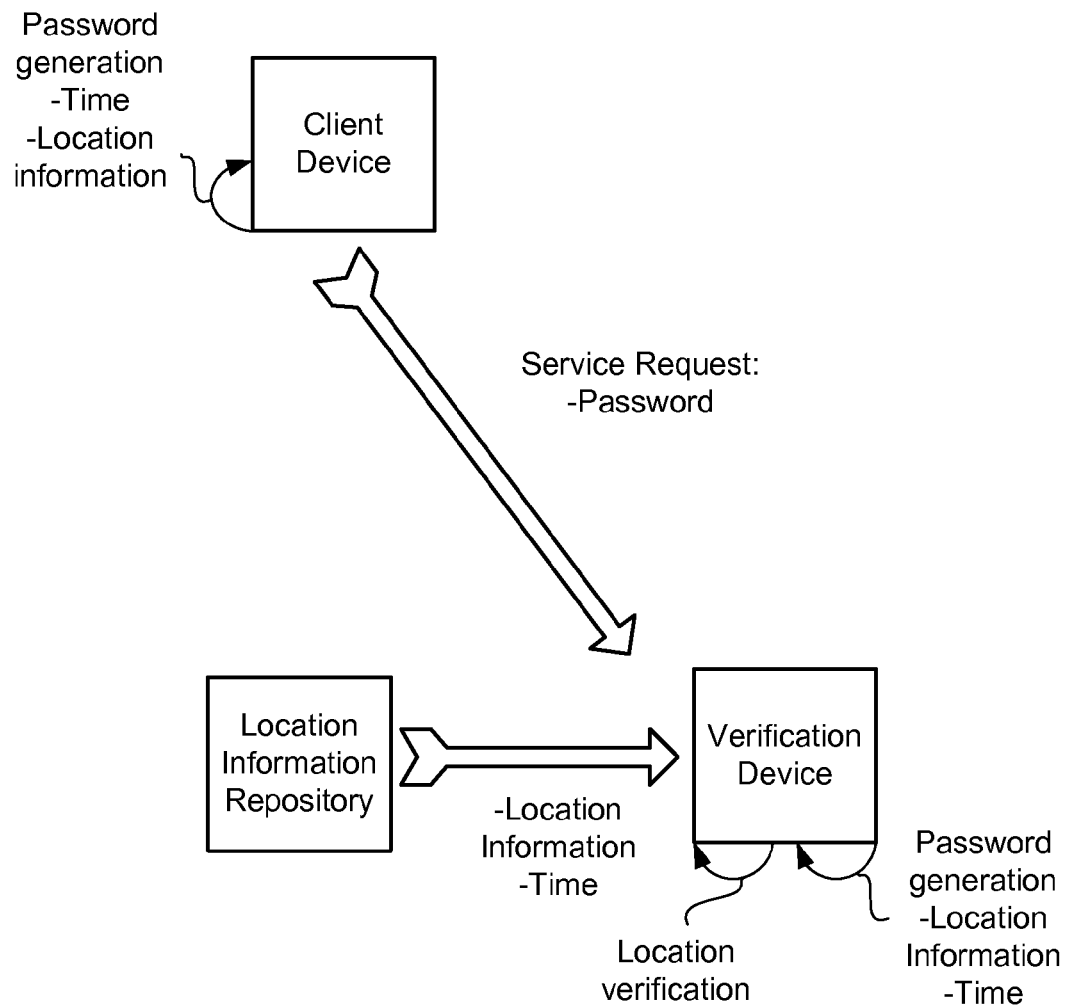
FIGS. 1A-1B illustrate example overviews of an implementation described herein.

FIG. 1A illustrates an example overview of an implementation described herein. As shown in FIG. 1A, a client device may generate a password based on geographic location information (hereinafter referred to as "location information") and based on a time (e.g., a current time or a past time). In some implementations, the location information may include longitude and latitude coordinates identifying a geographic location (hereinafter referred to as "location") of the client device. In some implementations, the longitude and latitude coordinates may be provided by a global positioning system (GPS) device associated with the client device. That is, the password may include information that identifies that the client device was located at the location at the time.

As further shown in FIG. 1A, the client device may place a service request to a verification device. In some implementations, the service request may include the password and a request for a particular service (e.g., a time and location-based service, such a request for access to content, a product delivery confirmation service, a timecard generation service, or the like).

In some implementations, the verification device may generate a password based on location information and time information (e.g., received from a location information repository or pre-provisioned into the verification device). For example, the location information repository may correspond to a location reporting application of the client device that reports a supposed location of the client device to the verification device. Additionally, or alternatively, the location information repository may correspond to an activity log that identifies the supposed location of an employee or other personnel, associated with the client device, at a particular time. Additionally, or alternatively, the location information may be static (e.g., pre-provisioned in the verification device) when the verification device is associated with a fixed location (e.g., an office location, a merchant venue, or the like).

In some implementations, the verification device may verify that the client device was located at the location at the time when the password, provided by the client device, matches the password formed by the verification device. As an example, assume that the verification device is associated with a fixed location. Given this assumption, the verification device may generate a password based on information identifying the fixed location and based on a current time. In some implementations, the password, generated by the verification device, may be used to verify whether the client device is currently located at the fixed location (e.g., when characters in the password, generated by the client device, match characters in the password generated by the verification device).

As another example, assume that the verification device is not associated with a fixed location (e.g., such for a situation where the verification device is to verify the location of a client device whose location may change at different points in time). Given this assumption, the verification device may generate a password based on location information provided by the location information repository (e.g., an activity log that identifies a supposed location of the client device at a time and/or a location reporting application of the client device that identifies the supposed location of the client device at the time). Further, the verification device may verify that the client device was located at the supposed location at the time when characters in the password, generated by the client device, match characters in the password generated by the verification device.

In some implementations, a password generation server may generate a password for the client device and another password for the verification device. In some implementations, the verification device may verify that the client device was located at a particular location at a particular time when characters, in the password provided by the password generation server to the client device, match characters provided by the password generation server to the verification device for that particular location.

Figure 1B:
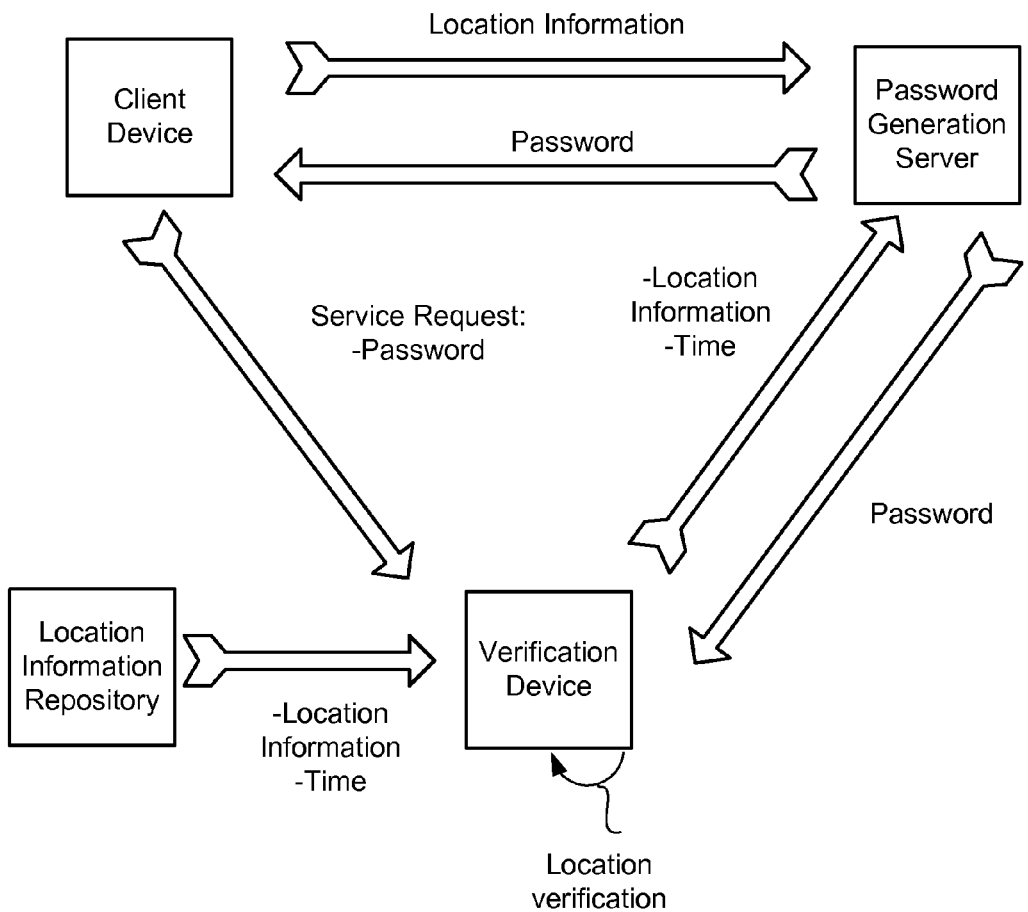

Referring to FIG. 1B, the client device may provide location information to a password generation server. In some implementations, the password generation server may receive the location information, and may generate a password based on the location information and based on a time at which the location information was received. In some implementations, the password generation server may provide the password to the client device.

As further shown in FIG. 1B, the client device may provide the password, as part of a service request, to the verification device. In some implementations, the verification device may provide location information, and time information (e.g., received from the location information repository or pre-provisioned in the verification device) to the password generation server and may receive a password from the password generation server (e.g., a password that is generated based on the location information and the time information). In some implementations, the verification device may verify the location of the client device at the time when characters in the password, received from the client device, match characters in the password received from the password generation server.

As a result, the location of the client device at a particular time (e.g., a current time or a past time) may be verified using a location-based and time-based password. In some implementations, the verification device may authorize the client device to access a network, access a particular directory on a server device, access particular content stored by a server device, or access a particular service based on verifying that the client device is located in a particular location at a particular time (e.g., a location and time at which the client device is authorized to access the particular directory and/or content).

In some implementations, the verification device may perform some other task or provide some other service based on verifying the location of the client device. For example, the verification device may provide an indication (e.g., to a content storage device) that the location of the client device at a current time has been verified such that a content storage device may provide content particular to the location of the client device (e.g., a targeted advertisement, a merchant promotion, or the like). In some implementations, the verification device may provide an indication to verify that a client device, associated with an employee, was located at the location at a particular time (e.g., to verify a product delivery, employee presence at a facility for employee time-keeping purposes, or to verify the presence of an employee at a particular location at a particular time for some other purpose).

While the systems and/or methods describe the generation of passwords, the systems and/or methods are not so limited. For example, the systems and/or methods may be used to generate keys, tokens, pass codes, pass keys, or some other type of information that may be used to verify the location of a client device at a particular time.

Figure 2:
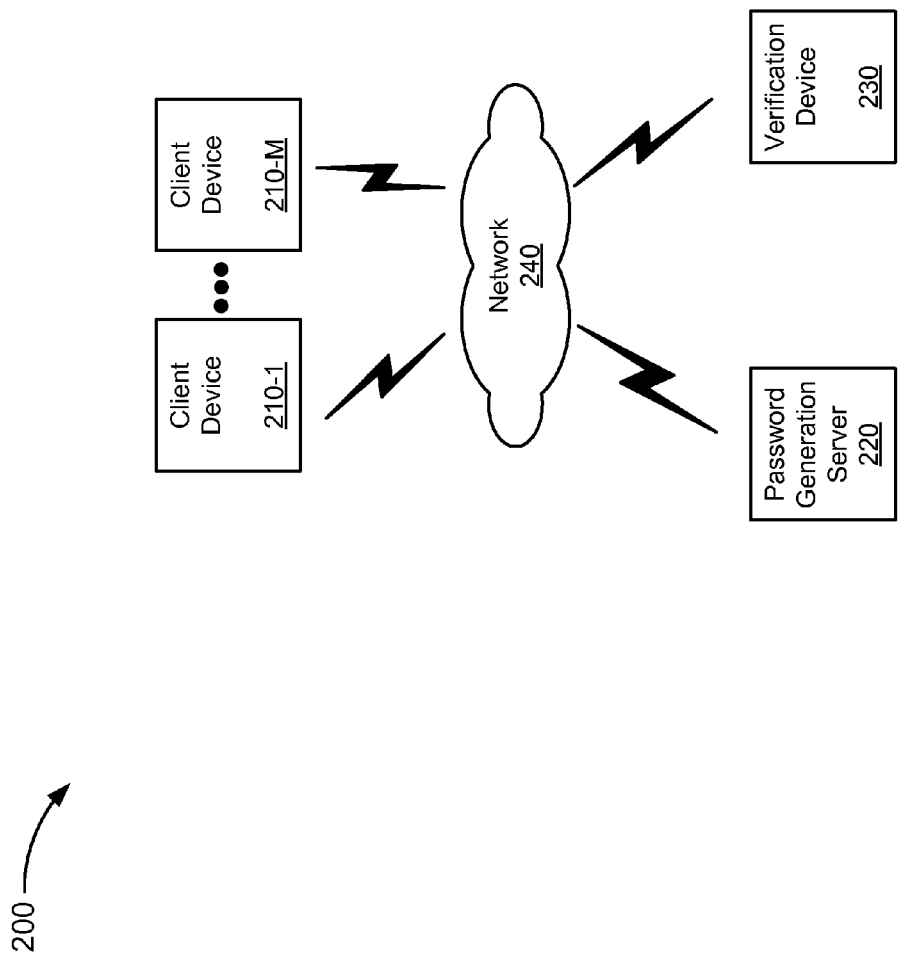
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include client devices 210-1, . . . , 210-M (where M≥1), password generation server 220, verification device 230, and network 240.

Client device 210 may include a device capable of communicating via a network, such as network 240. For example, client device 210 may correspond to a mobile communication device (e.g., a smart phone or a personal digital assistant (PDA)), a portable computer device (e.g., a laptop or a tablet computer), a key fob, a desktop computing device, a server device, a content storage device, and/or some other type of device.

In some implementations, client device 210 may include an application to generate a password (e.g., a time and location-based password), used to verify the location of client device 210 at a particular time, based on location information and time information. In some implementations, client device 210 may generate the password using a random key generator, a hash-based message authentication code (HMAC) algorithm, a time-based one-time password (TOTP) algorithm, an HMAC-based one-time password algorithm (HOTP), and/or some other algorithm or technique.

Additionally, or alternatively, client device 210 may communicate with password generation server 220 in order to receive a password that may be used to verify a location of client device 210 at a particular time. In some implementations, the information identifying a location of client device 210 may be provided via a GPS device or via some other type of device associated with client device 210. In some implementations, client device 210 may provide the information identifying the location and information identifying the particular time as part of a service request provided to verification device 230 (e.g., a request to access a particular directory or content, a request for a product delivery confirmation, a time-keeping service request, and/or some other type of service request).

Password generation server 220 may include one or more computing devices, such as a server device or a collection of server devices. In some implementations, password generation server 220 may receive a request for a password and may generate a password based on inputs, such as location information and time information. Additionally, or alternatively, password generation server 220 generate a password based on some other input, such as a salt value or some other cryptographic value. In some implementations, password generation server 220 may generate the password using a random key generator, an HMAC algorithm, a TOTP algorithm, an HOTP algorithm, and/or some other algorithm or technique.

In some implementations, password generation server 220 may receive the request from client device 210. Additionally, or alternatively, password generation server 220 may receive the request from verification device 230. In some implementations, password generation server 220 may store authorization information that may be used to authorize client device 210 and/or verification device 230 to receive a password (e.g., based on login credentials, a device identifier (ID) of client device 210, biometrics data, and/or some other type of authorization information).

Verification device 230 may include one or more computing devices, such as a server device or a collection of server devices. In some implementations, verification device 230 may include an application to generate a password (e.g., a time and location-based password), used to verify the location of client device 210 at a particular time, based on location information and time information. As described above, the location information may correspond to a fixed location (e.g., for a facility, such as an office building, a residence, a merchant facility, or the like). Additionally, or alternatively, the location information may correspond to information provided by a location information repository (e.g., an activity log or a location reporting application of client device 210 that identifies a supposed location of client device 210 at a particular time). In some implementations, verification device 230 may generate the password using a random key generator, an HMAC algorithm, a TOTP algorithm, an HOTP algorithm, and/or some other algorithm or technique.

In some implementations, the functions of password generation server 220 may be implemented by client device 210 and/or verification device 230.

Additionally, or alternatively, verification device 230 may communicate with password generation server 220 to request a password to verify a location of client device 210 at a particular time. In some implementations, verification device 230 may include an application that may provide a particular service based on verifying a location of client device 210 at a particular time. For example, verification device 230 may provide an authorization gateway service to authorize a first client device (e.g., client device 210-1) to access a second client device (e.g., client device 210-2) based on the location of client device 210-1. For example, verification device 230 may provide authentication information that client device 210-1 may use to access client device 210-2 (e.g., based on verifying the location of client device 210-1). Additionally, or alternatively, verification device 230 may transmit data flows between client device 210-1 and client device 210-2 based on authorizing client device 210-1 to communicate with client device 210-2. In some implementations, verification device 230 may provide access to particular directories of client device 210-2 based on partially verifying a location of client device 210-1. In some implementations, verification device 230 may provide particular content based on verifying the location of client device 210-1.

In some implementations, verification device 230 may include an application that may provide a time-keeping service. For example, verification device 230 may verify the location of client device 210, associated with a particular employee, to verify that the employee was located at an office location during business hours. Based on verifying that the employee was located at the office location during business hours, verification device 230 may generate a time card that indicates times at which the employee was located at the office location.

In some implementations, verification device 230 may include an application that may provide a product delivery confirmation service. For example, verification device 230 may verify the location of client device 210, associated with a particular employee, to verify that the employee was located at a delivery location of particular goods and/or services. Based on verifying that the employee was located at the delivery location at the time a product was delivered, verification device 230 may generate a delivery confirmation report.

In some implementations, client device 210 may function as verification device 230 and verification device 230 may function as client device 210. For example, client device 210 may include an application to provide a particular service or perform a particular task. As an example, verification device 230 may provide a location verification service and may provide an indication that the location of client device 210-1 has been verified at a particular time. In some implementations, client device 210-2 may perform a task based on receiving the indication that the location of client device 210-1 has been verified at the particular time (e.g., perform a time-keeping verification function, a product delivery verification function, etc.).

Network 240 may include one or more wired and/or wireless networks. For example, network 240 may include a cellular network (e.g., a second generation (2G) network, a third generation (3G) network, a fourth generation (4G) network, a fifth generation (5G) network, a long-term evolution (LTE) network, a global system for mobile (GSM) network, a code division multiple access (CDMA) network, an evolution-data optimized (EVDO) network, or the like), a public land mobile network (PLMN), and/or another network. Additionally, or alternatively, network 240 may include a local area network (LAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
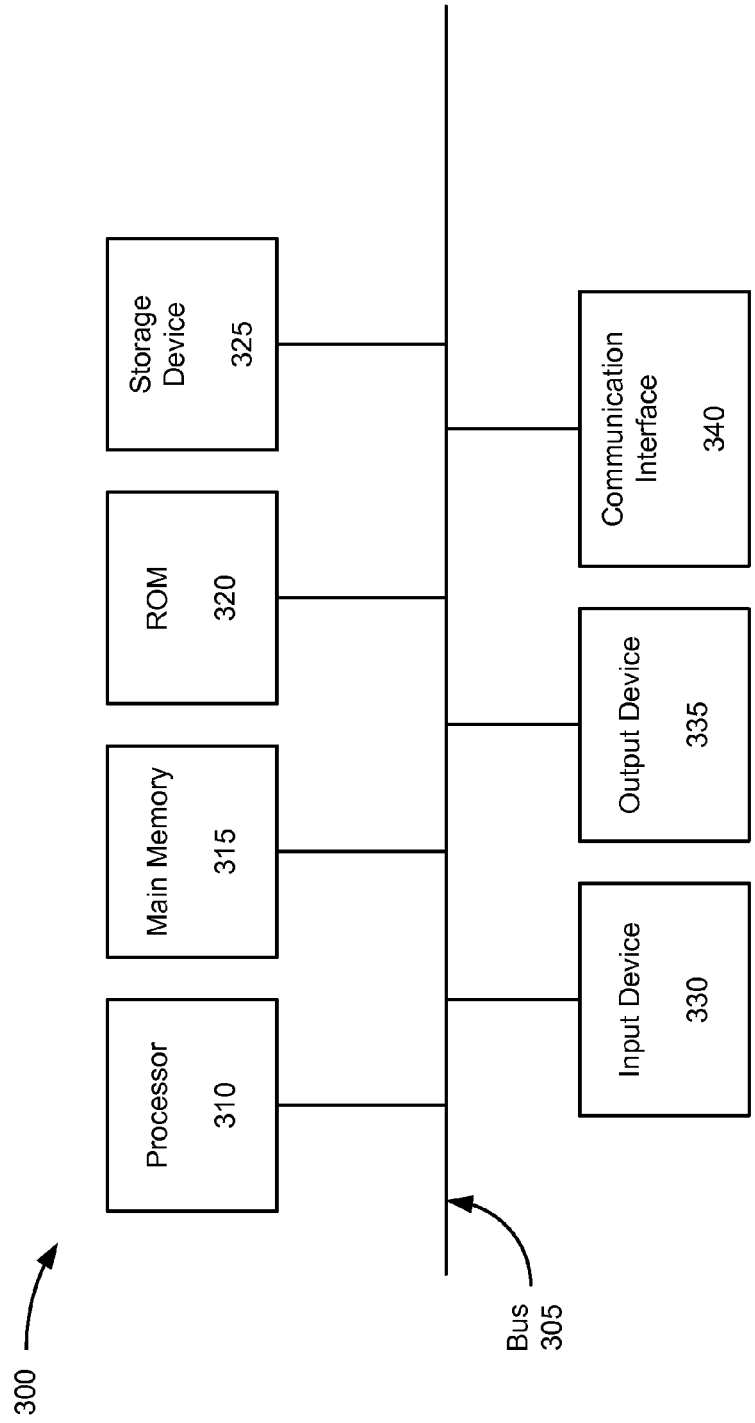
FIG. 3 illustrates example components of a device that may be used within the environment of FIG. 2.

FIG. 3 illustrates example components of a device 300 that may be used within environment 200 of FIG. 2. Device 300 may correspond to client device 210, password generation server 220, and/or verification device 230. Each of client device 210, password generation server 220, and/or verification device 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, a touch screen, and/or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface. In some implementations, communication interface 340 may include a global positioning system (GPS) to provide location information.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
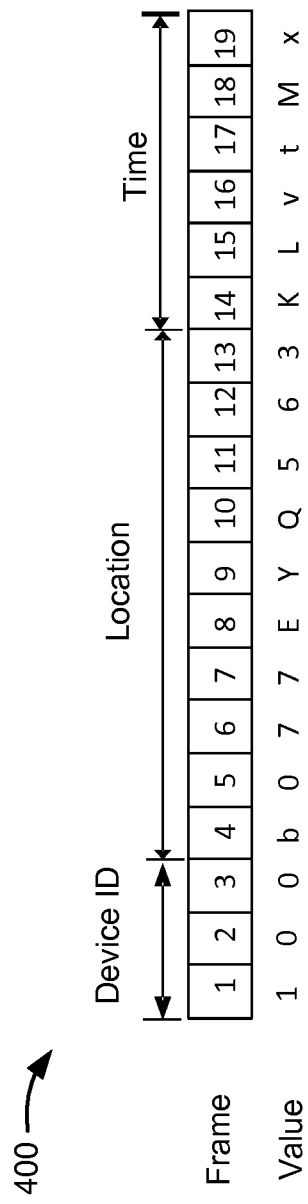
FIG. 4 illustrates an example data structure that may be stored by one or more devices in the environment of FIG. 2.

FIG. 4 illustrates an example data structure 400 that may be stored by one or more devices in environment 200, such as client device 210, password generation server 220, and/or verification device 230. In some implementations, data structure 400 may be stored in a memory of client device 210, password generation server 220, and/or verification device 230. In some implementations, data structure 400 may be stored in a memory separate from, but accessible by, password generation server 220.

A particular instance of data structure 400 may contain different information and/or fields than another instance of data structure 400. In some implementations, data structure 400 may correspond to an example format of a password generated by client device 210, password generation server 220, and/or verification device 230.

As shown in FIG. 4, a password may include a string of characters and may identify an identifier (ID) of client device 210 (e.g., a device ID), a location of client device 210, and a time at which the password was generated or requested by client device 210 (e.g., a time corresponding to when client device 210 was located at the location). In the example shown in FIG. 4, the password may be 19 characters in length (e.g., as represented by frames 1-19). In some implementations, password may have some other length. In some implementations, client device 210, password generation server 220, and/or verification device 230 may translate inputs (e.g., location information, time information, a device ID of client device 210, etc.), into corresponding values. For example, client device 210, password generation server 220, and/or verification device 230 may translate the device ID, information identifying the location of client device 210 (e.g., in terms of longitude/latitude coordinates, a street address, a zip code, a city/town/state name, an area code, a region name, etc.), and the time information into corresponding values. In some implementations, the values may be stored in a particular format, such as the example format shown in FIG. 4. In some implementations, client device 210, password generation server 220, and/or verification device 230 may translate the inputs using a look-up table, a translation algorithm, a key generator, or the like.

In some implementations, the values identifying the location may include values identifying different levels of precision of the location. For example, the first two values of the location may identify a country, whereas the following three values may identify a city/town, whereas the following four values may identify a street address. As described in greater detail below, verification device 230 may partially verify client device 210 when a password, received from client device 210, partially matches a password generated by verification device 230 or received from password generation server 220 (e.g., when verification device 230 verifies, based on the password provided by client device 210, that that client device 210 was located in a particular same city/town, but does not verify that the client device was located at a particular street address).

While particular fields are shown in a particular format in data structure 400, in practice, data structure 400 may include additional fields, fewer fields, different fields, or differently arranged fields than are shown in FIG. 4. Also, FIG. 4 illustrates examples of information stored by data structure 400. In practice, other examples of information stored by data structure 400 are possible. For example, a password, generated by client device 210, password generation server 220, and/or verification device 230, may include any number of characters, and the format of the password may vary from the example shown in FIG. 4.

Figure 5:
FIG. 5 illustrates an example data structure that may be stored by one or more devices in the environment of FIG. 2.

FIG. 5 illustrates an example data structure 500 that may be stored by one or more devices in environment 200, such as verification device 230. In some implementations, data structure 500 may be stored in a memory of verification device 230. In some implementations, data structure 500 may be stored in a memory separate from, but accessible by, verification device 230. In some implementations, data structure 500 may be stored by some other device in environment 200, such as client device 210 and/or password generation server 220.

A particular instance of data structure 500 may contain different information and/or fields than another instance of data structure 500. In some implementations, information stored by data structure 500 may be used by a particular verification device 230 to verify a location of client device 210 at a particular time and to provide a service to client device 210 based on verification the location of client device 210 at the particular time.

As shown in FIG. 5, data structure 500 may include verification device information 510, verification level determination field 520, and authorized services field 530.

Verification device information field 510 may store information identifying a particular verification device 230 associated with a particular instance of data structure 500. In some implementations, verification device information field 510 may store an identifier of the particular verification device 230. Additionally, or alternatively, verification device information field 510 may identify a particular function, application, or service provided by verification device 230. For example, as described above, verification device 230 may function as an authorization gateway to provide an authorization service to allow or prevent access to particular directories/content associated with a particular client device 210 (e.g., client device 210-1). For example, verification device 230 may allow client device 210-2 to access particular directories/content of client device 210-1 based on a time and a location of client device 210-2.

Additionally, or alternatively, verification device 230 may provide a time-keeping service to generate a timecard for an employee based on verifying that a client device 210, associated with the employee, was located at a particular office location during business hours. Additionally, or alternatively, verification device 230 may provide a product delivery confirmation service to verify that a client device 210, associated with delivery personnel, was located at a delivery location during a delivery time. Additionally, or alternatively, verification device 230 may provide some other service using some other application or function of verification device 230.

As an example, assume that in FIG. 5, verification device 230 functions as an authorization gateway to provide an authorization service for client device 210 having the ID of 123 (to be referred to as "client device 210-1" in FIG. 5). For example, verification device 230 may provide access to client device 210-1 by a requesting client device 210 (to be referred to as "client device 210-2" in FIG. 5) that provides a service request to access client device 210-1. In some implementations, verification device information field 510 may store information identifying that verification device 230 functions as an authorization gateway to provide an authorization service for client device 210-1 having the ID of 123.

Verification level determination field 520 may store information that may be used to identify a verification level of client device 210-2. In some implementations, verification device 230 may identify the verification level of client device 210-2 based on a password provided by client device 210-2 (e.g., a password that may be used to verify a location of client device 210-2 at a particular time). As described above, verification device 230 may verify the location of client device 210-2 at a particular time when characters in a password, received from client device 210-2, match characters in a password generated by verification device 230 or received from password generation server 220 (e.g., a password received from password generation server 220 based on providing password generation server 220 with inputs identifying the location and the particular time).

In some implementations, verification device 230 may fully or partially verify the location of client device 210-2 based on information stored by verification device information field 510. For example, verification device 230 may fully verify that client device 210-2 was located at the particular location at the particular time when all characters of the password, provided by client device 210-2, match all characters of the password generated by verification device 230 or received from password generation server 220 (e.g., as indicated by a 100% verification level). Further, verification device 230 may partially verify that client device 210-2 was located at the particular location at the particular time when the first set of characters (e.g., 5, 10, 15, etc.) of the password, provided by client device 210-2, match the same set of characters of the password generated by verification device 230 or received from password generation server 220. In the example shown in FIG. 5, the verification level of client device 210-2 may be 90% when the first 10 characters of the password, provided by client device 210-2, match the first 10 characters of the password generated by verification device 230 or received from password generation server 220.

In some implementations, the verification level may correspond to a precision level that the location of client device 210-2 has been verified. For example, a verification level 100% may indicate that the location of client device 210-2 has been verified with a precision to a particular street address, whereas a verification level of 90% may indicate that the location of client device 210-2 has been verified with a precision to a range of street addresses. A verification level of 40% may indicate that the location of client device 210-2 has been verified with a precision to a city/town, but not a street address. That is, verification device 230 may partially verify client device 210 when a password, received from client device 210-2, partially matches a password generated by verification device 230 or received from password generation server 220 (e.g., when the password from client device 210-2 verifies that client device 210-2 was located in a particular city/town, but not at a particular street address). As described in greater detail below, client device 210-2 may access different services based on different verification levels. Additionally, or alternatively, verification device 230 may provide different services or perform different tasks based on the verification level of client device 210-2.

Authorized services field 530 may store information identifying services that verification device 230 may provide and/or services that client device 210-2 may receive, based on the location of client device 210-2 at a particular time and based on a verification level of client device 210-2. As an example, assume that client device 210-2 may access a particular directory on client device 210-1 (e.g., the directory: \Location 1\Unrestricted) during the times of 9 AM-8 PM when client device 210-2 is located at the location of "location 1" and when the verification level of client device 210-2 is 100%. Given this assumption, authorized services field 530 may store information to identify that client device 210-2 may access the particular directory \Location 1\Unrestricted when the client device 210-2 is located at "location 1" during the times of 9 AM-8 PM. In some implementations, verification device 230 may provide authentication information to client device 210-2 that client device 210-2 may use to access the directory \Location 1\Unrestricted on client device 210-1. Additionally, or alternatively, verification device 230 may function as a gateway to transmit communications between client device 210-1 and client device 210-2 to allow client device 210-2 to access the directory \Location 1\Unrestricted on client device 210-1. In some implementations, verification device 230 may prevent client device 210-2 from accessing client device 210-1 altogether when the verification level is less than a particular threshold.

As another example, assume that that client device 210-2 may access a particular directory on client device 210-1 (e.g., the directory: \Location 1\Restricted) during the times of 9 AM-8 PM when client device 210-2 is located at the location of "location 1" and when the verification level of client device 210-2 is 90%. Given this assumption, authorized services field 530 may store information to identify that client device 210-2 may access the particular directory \Location 1\Unrestricted when the client device 210-2 is location at "location 1" during the times of 9 AM-8 PM.

While particular fields are shown in a particular format in data structure 500, in practice, data structure 500 may include additional fields, fewer fields, different fields, or differently arranged fields than are shown in FIG. 5. Also, FIG. 5 illustrates examples of information stored by data structure 500. In practice, other examples of information stored by data structure 500 are possible. For example, authorized services field 530 may store information that identifies other services and/or tasks that verification device 230 may provide and/or perform based on the location of client device 210 at a particular time and/or based on a verification level of client device 210.

Figure 6:
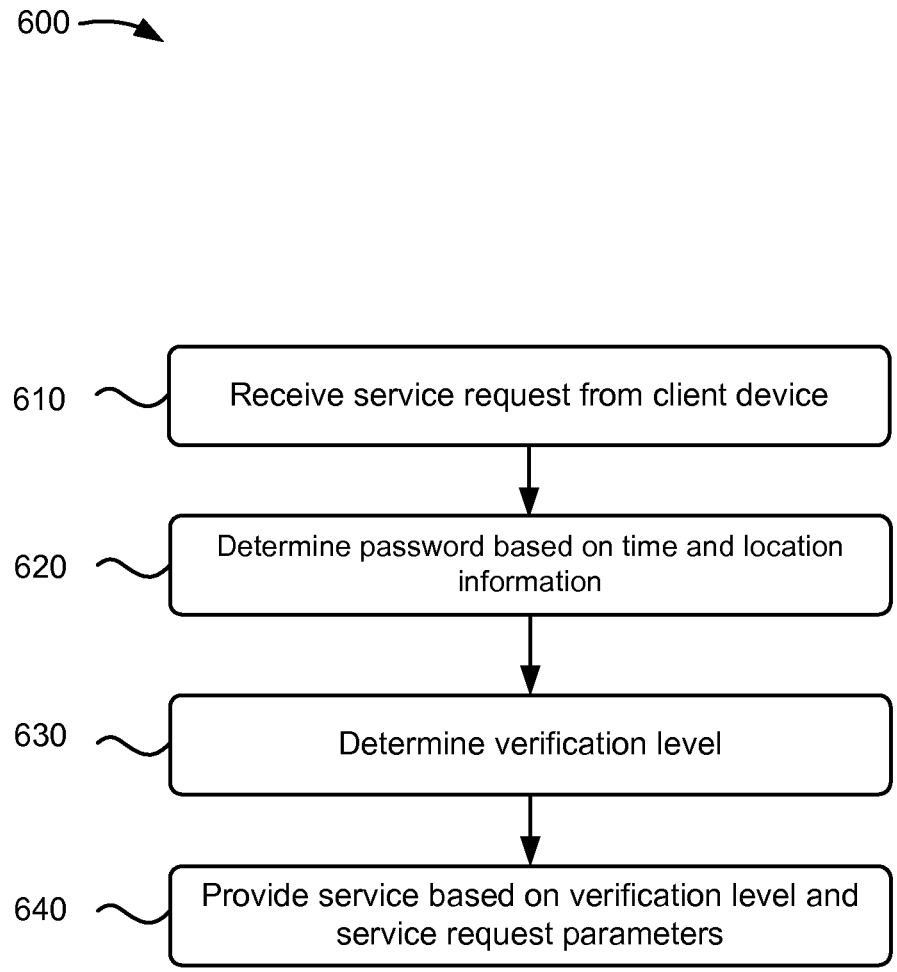
FIG. 6 illustrates a flowchart of an example process for providing a service to a client device based on verifying the location of the client device at a particular time.

FIG. 6 illustrates a flowchart of an example process 600 for providing a service to a client device based on verifying the location of the client device at a particular time. In one implementation, process 600 may be performed by one or more components of verification device 230. In another implementation, some or all of blocks of process 600 may be performed by one or more components of another device in environment 200 (e.g., client device 210 and/or password generation server 220), or a group of devices including or excluding verification device 230.

As shown in FIG. 6, process 600 may include receiving a service request from a client device (block 610). For example, verification device 230 may receive the service request from a requesting client device 210 (e.g., client device 210-1). In some implementations, the service request may include a request for client device 210-1 to access content and/or a directory stored by client device 210-2. Additionally, or alternatively, the service request may include a product delivery confirmation service request, a time-keeping service request, and/or some other service request relating to a time/location-based application. In some implementations, the service request may include location information identifying a supposed location of client device 210-1 (e.g., based on information provided by a GPS device of client device 210-1), time information identifying a time at which client device 210-1 was supposedly located at the location, and/or a password that verification device 230 may use to verify that client device 210-1 was located at the location at the time. For example, client device 210-1 may generate the password based on location information provided by the GPS of client device 210-1. Alternatively, client device 210-1 may provide the location and time information to password generation server 220 to receive the password from password generation server 220.

As described above, client device 210-1 or password generation server 220 may generate the password based on the location and time information. Additionally, or alternatively, client device 210-1 or password generation server 220 may generate the password based on some other password generation parameter, such as a device ID of client device 210-1, a salt value corresponding to a device ID of client device 210-1, and/or some other information. For example, client device 210-1 or password generation server 220 may translate the location information, time information, salt value, device ID, and/or other password generation parameter (e.g., using a translation algorithm, a look-up table, a key, a hash generator, and/or some other technique) to form the password. In some implementations, client device 210-1 or password generation server 220 may form the password using a particular translation algorithm, look-up table, key, hash generator, etc. based on the salt value. In some implementations, password generation server 220 may form the password when the location information identifies an authorized location where client device 210-1 may receive the password.

In some implementations, password generation server 220 and/or verification device 230 may authenticate the location information, received from client device 210-1, to ensure that the location information identifies the location of client device 210-1 and that the location information has not been modified. For example, the location information may include a header having an application ID or some other type of identifier that identifies that the location information originated from a GPS device and/or a particular location reporting application of client device 210-1.

Process 600 may also include determining a password based on time and location information (block 620). For example, verification device 230 may receive the location information from a location information repository. As described above, the location information repository may correspond to a location reporting application of client device 210-1 that reports a supposed location of client device 210-1 to verification device 230. Additionally, or alternatively, the location information repository may correspond to an activity log that identifies the supposed location of an employee or other personnel, associated with client device 210-1, at a particular time. Additionally, or alternatively, the location information may be static (e.g., pre-provisioned in verification device 230) when verification device 230 is associated with a fixed location (e.g., a facility, such as an office facility, a residence, a merchant venue, or the like). In some implementations, the time information may correspond to a current time or a past time. In some implementations, verification device 230 may generate the password based on some other parameters, such as a device ID of client device 210-1, a salt value corresponding to the device ID, and/or some other password generation parameter.

In some implementations, verification device 230 may provide the location information, time information, device ID, salt value, and/or other password generation parameter, to password generation server 220 to receive the password (e.g., in lieu of verification device 230 generating the password). In some implementations, password generation server 220 may receive the password generation parameters from verification device 230, generate the password based on the password generation parameters and may provide the password to verification device 230 based on generating the password.

In some implementations, verification device 230 may store the password for future use such that verification device 230 may not need to generate the password or request the password from password generation server 220 at a later time for the same password generation parameters. In some implementations, verification device 230 may simply read a password when verification device 230 stores the password corresponding to the service request. For example, assume that verification device 230 stores a password that corresponds to a particular set of password generation parameters (e.g., information identifying a particular device ID of client device 210-1, a particular geographic location, a particular time, etc.). Further, assume that verification device 230 receives the particular set of password generation parameters in the service request from client device 210-1. Given this assumption, verification device 230 simply read the password since verification device 230 stores the password corresponding to the particular set of password generation parameters.

Process 600 may further include determining a verification level (block 630). For example, verification device 230 may determine the verification level of the client device 210-1 based on comparing the password received from client device 210-1 with the password generated by verification device 230 or received from password generation server 220 (or the password being stored by verification device 230). Further, verification device 230 may determine the verification level based on information stored by verification level determination field 520. For example, as described above with respect to verification level determination field 520, verification device 230 may determine a verification level of 100% when all of the characters in the password, provided by client device 210-1, match all of the characters in the password provided to verification device 230 by password generation server 220. In some implementations, verification device 230 may determine a verification of less than 100% when less than all of the characters in the password, provided by client device 210-1, match the characters in the password generated by verification device 230 or provided to verification device 230 by password generation server 220. In some implementations, verification device 230 may determine either a 0% verification level or a 100% verification level (e.g., for applications/services where all of the characters, in the password provided by client device 210-1, are to match the characters in the password generated by verification device 230 or provided to verification device 230 by password generation server 220, such as for a delivery confirmation service and/or a timekeeping service).

Process 600 may also include providing a service based on the verification level and the password generation parameters (block 640). For example, verification device 230 may provide a particular service based on the verification level, the password generation parameters (e.g., the device ID, the time information, the location information, etc.), and based on information stored by authorized services field 530. As described above with respect to authorized services field 530, verification device 230 may permit access to particular directories and/or content stored by client device 210-2 based on the verification level of client device 210-1 (e.g., when verification device 230 provides an authorization service to permit client device 210-1 to access client device 210-2) and based on the location of client device 210-1 at a particular time, the device ID of client device 210-1, and/or some other information.

In some implementations (e.g., when verification device 230 provides a timekeeping service via a timekeeping application and/or a product delivery confirmation service via a product delivery application), verification device 230 may provide an indication that the location of client device 210-1 at a particular time has been verified (e.g., a location corresponding to an office location for an employee of client device 210-1 or a delivery location of a product and a time corresponding to business hours or a delivery time).

In some implementations, block 640 may be omitted when verification device 230 determines that a verification level is below a particular threshold, thereby directing verification device 230 to deny the service to client device 210 altogether.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel.

Figure 7A:
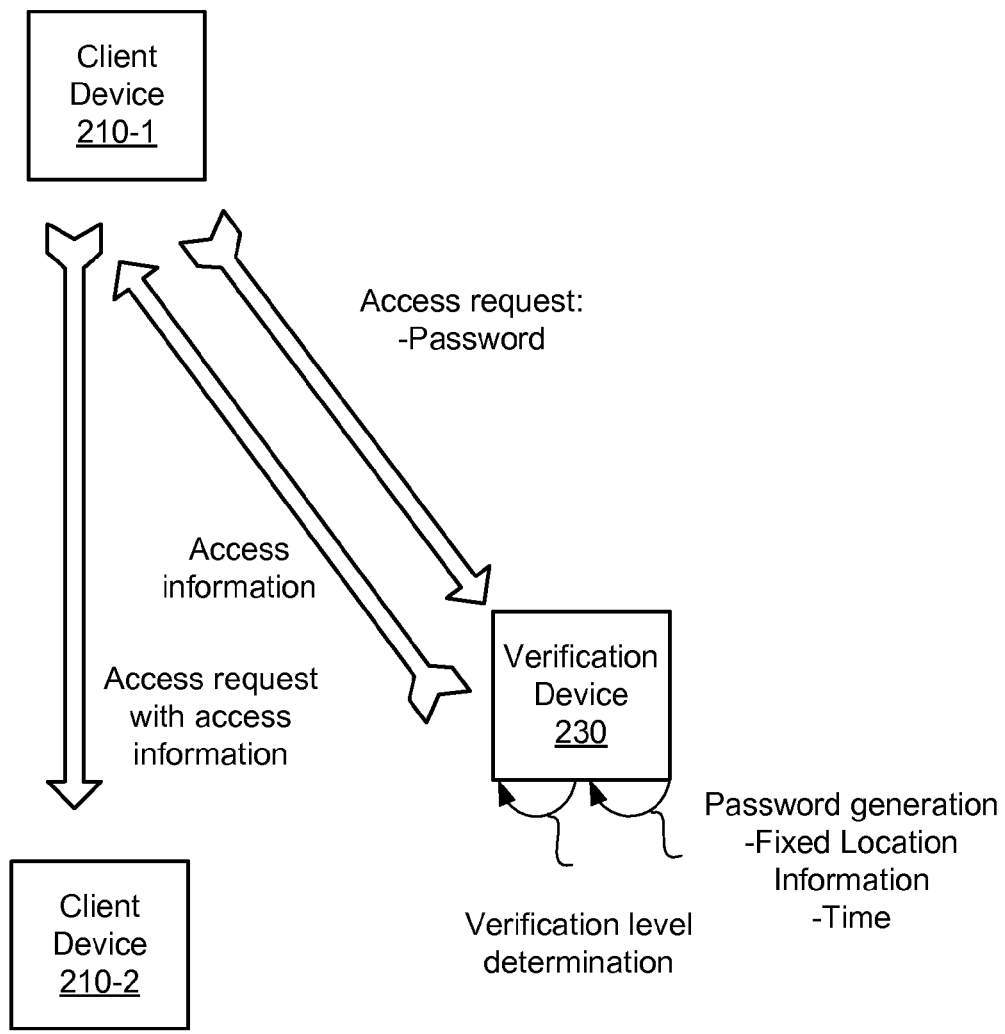
FIGS. 7A-7B illustrate example implementations as described herein.
Figure 7B:
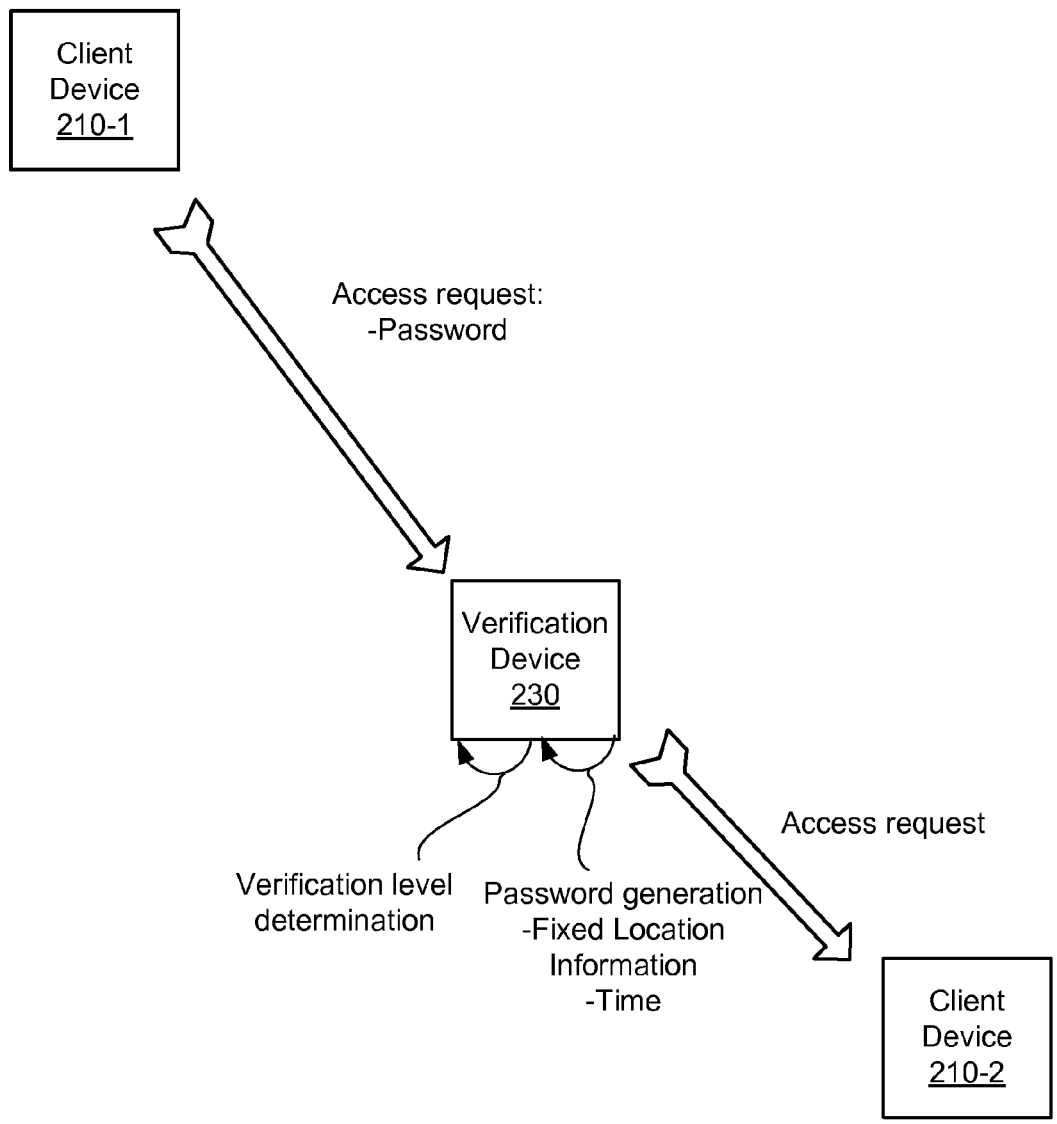

FIGS. 7A-7B illustrate example implementations as described herein. In FIG. 7A, assume that a requesting client device 210 (e.g., client device 210-1) requests to access content stored by a content storage client device (e.g., client device 210-2). Further, assume that verification device 230 provides a gateway service to authorize client device 210-1 to access client device 210-2 based on the location of client device 210-1 at a particular time. For example, client device 210-2 may provide content to client device 210-1 when client device 210-1 is located at a particular location at a particular time (e.g., content relating to a targeted advertisement pertinent to the particular location at the particular time, such as a merchant promotion for a product). Further, assume that client device 210-1 is located at the particular location at the particular time. Given these assumptions, client device 210-1 may generate a password based on password generation parameters (e.g., information identifying a location of client device 210-1 and time information corresponding to a current time).

In some implementations, client device 210-1 may provide an access request to verification device 230. In some implementations, the access request may include a request to access client device 210-2 and the password. In some implementations, verification device 230 may generate a password based on password generation parameters. For example, verification device 230 may generate the password based on location information of a fixed location, such as a merchant facility where client device 210-1 may receive content for targeted advertising for a promotion at the merchant facility. Further, verification device 230 may generate the password further based on a current time. In some implementations, verification device 230 may determine a verification level of client device 210-1 based on the password received from client device 210-1, the password generated by verification device 230, and information stored by verification level determination field 520.

In some implementations, verification device 230 may verify that client device 210-1 is located at the particular location at the particular time (e.g., the current time) and may provide client device 210-1 with access information that client device 210-1 may use to access and/or request content from client device 210-2. For example, verification device 230 may provide client device 210-1 with login credentials, an access key, and/or some other information that client device 210-1 may use to access and/or request the content from client device 210-2. As a result, client device 210-1 may receive the content from client device 210-2 when verification device 230 determines that client device 210-1 is located at the particular location at the particular time and when client device 210-2 is to provide content to client device 210-1 when client device 210-1 is located at the particular location at a particular time (or a time that is within a particular time period in which client device 210-1 may access client device 210-2).

In some implementations, verification device 230 may authorize client device 210-1 to access client device 210-2 (e.g., when client device 210-1 is located at the particular location during a particular time period) using some other technique. For example, referring to FIG. 7B, verification device 230 may function as a gateway to transmit an access request to client device 210-2 on behalf of client device 210-1. In some implementations, verification device 230 may transmit communications between client device 210-1 and client device 210-2 based on verifying that client device 210-1 may communicate with client device 210-2 (e.g., based on verifying that client device 210-1 is located at the particular location during the particular time period).

While particular examples are shown in FIGS. 7A-7B, the above descriptions are merely example implementations. In practice, other examples are possible from what is described above with respect to FIGS. 7A-7B.

Figure 8:
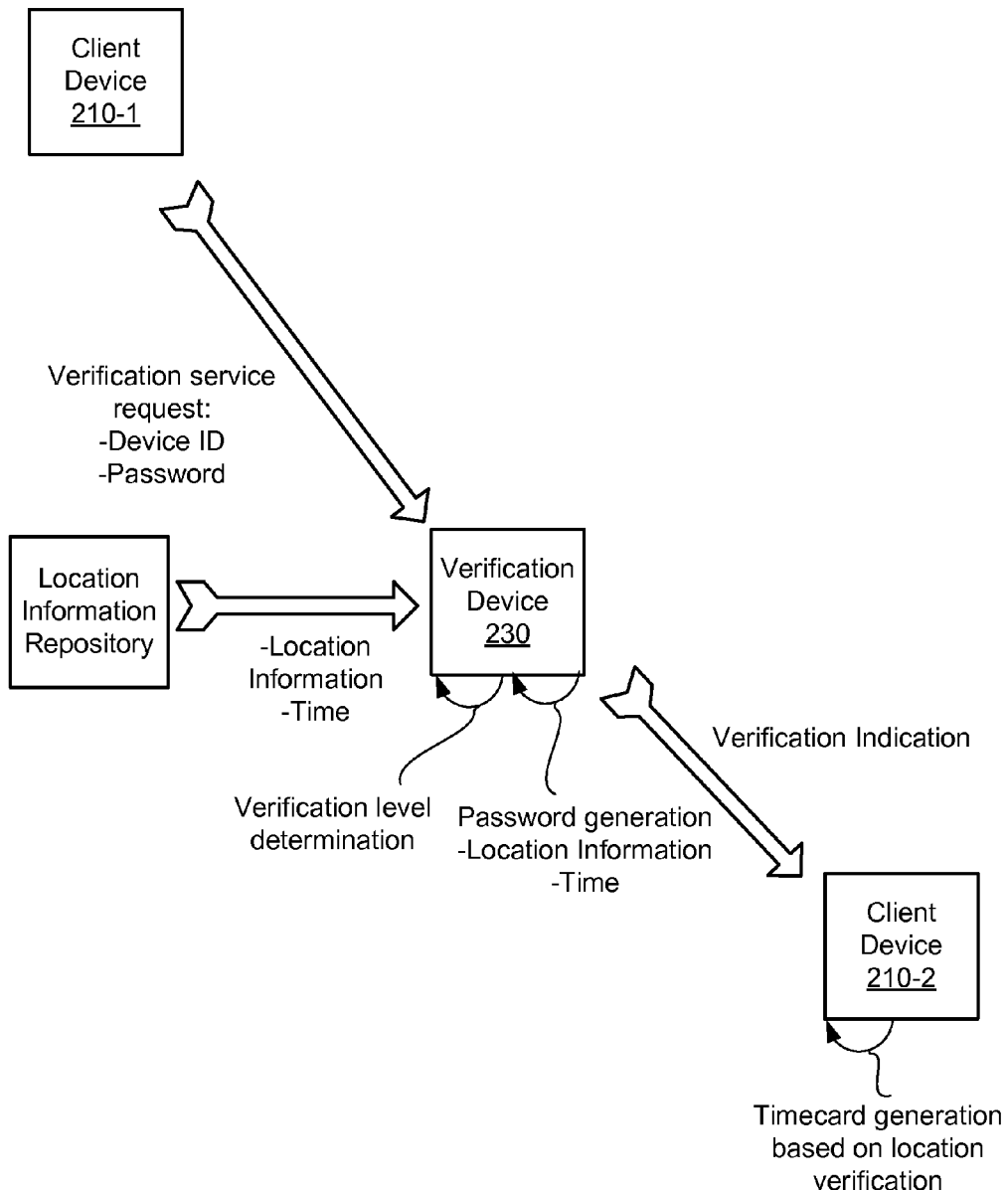
FIG. 8 illustrates an example implementation as described herein.

FIG. 8 illustrates an example implementation as described herein. In FIG. 8, assume that client device 210-1 is associated with an employee and that verification device 230 provides a location verification service to verify the location of client device 210-1 at a particular time or during a particular time period. Further, assume that verification device 230 provides a verification indication to client device 210-2 and that client device 210-2 generates a timecard for the employee based on the verification indication. Given these assumptions, client device 210-1 may generate a password based on password generation parameters (e.g., information identifying a location of client device 210-1, time information corresponding to a current time, and a device ID corresponding to client device 210-1 that is associated with the employee).

In some implementations, client device 210-1 may provide a verification service request to verification device 230. In some implementations, the verification service request may include a request to verify the location of client device 210-1 at the particular time, a request to provide a verification indication to client device 210-2, the password, and the password generation parameters (e.g., the device ID). In some implementations, verification device 230 may generate a password based on password generation parameters (e.g., location information, time information, and the device ID of client device 210-1). As described above, the location information and/or time information may be provided by a location information repository. In some implementations, verification device 230 may verify the location of client device 210-1 based on the password received from client device 210-1 and the password generated by verification device 230 (e.g., when the characters in both passwords match).

In some implementations, verification device 230 may provide a verification indication to client device 210-2. In some implementations, the verification indication may identify that client device 210-1 was located at the particular location at the particular time. In some implementations, client device 210-2 may receive the verification indication, and may generate a timecard that identifies that the employee, associated with client device 210-1, was located at the particular location at the particular time (e.g., as an employee "check-in" process, such as for an employee who is to report to the particular location at the particular time). Additionally, or alternatively, client device 210-2 may generate a report to verify a product delivery based on verifying the location of client device 210-1 at a particular time (e.g., when client device 210-1 is associated with delivery personnel). In some implementations, verification device 230 may generate the timecard or generate the report to verify the product delivery without involving client device 210-2.

While a particular example is shown in FIG. 8, the above description is merely example implementations. In practice, other examples are possible from what is described above with respect to FIG. 8.

As described above, verification device 230 may provide a service based on verifying that client device 210 was located at a particular location at a particular time (e.g., a particular time during a time period). For example, verification device 230 may provide an authorization service to authorize client device 210 to access a network and/or access a particular directory/content on another client device 210. Additionally, or alternatively, verification device 230 may provide some other service (e.g., a location verification service, a timekeeping or check-in service, a product delivery service, or the like).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by a first device, a first password from a second device,
   the first password being generated based on first location information identifying
   a geographic location of the second device, first time information identifying a particular time at which the second device was at the geographic location, and an algorithm;
   receiving, by the first device and from a device separate from the second device, second location information identifying the geographic location of the second device and second time information identifying the particular time at which the second device was at the geographic location;
   determining, by the first device, a second password based on the second time information, the second location information identifying the geographic location of the second device, and the algorithm;
   determining, by the first device, that the second device is located at the geographic location at the particular time when characters in the first password match characters in the second password;
   determining, by the first device, a verification level based on a quantity of characters in the first password that match characters in the second password;
   selecting, by the first device, a service based on the verification level; and providing, by the first device, the service based on selecting the service and determining that the second device is located at the geographic location at the particular time.

2. The method of claim 1, where providing the service includes authorizing the second device to access content or to provide an indication that identifies that the second device is located at the geographic location at the particular time.

3. The method of claim 1, further comprising:
   determining that the first device is to provide the service when the geographic location is authorized, where providing the service is based on determining that the first device is to provide the service when the geographic location is authorized.

4. The method of claim 1, where determining the second password is based on receiving the second location information identifying the geographic location.

5. The method of claim 1, where determining the second password includes using the second time information and the second location information identifying the geographic location to form the second password.

6. The method of claim 1, where the first password and second password include information identifying the particular time,
where determining that the second device is located at the geographic location includes determining that the second device is located at the geographic location at the particular time included in the first password and the second password,
the particular time being a current time.

7. The method of claim 1, further comprising:
determining that the second device is not located at the geographic location at the particular time when characters in the first password do not match characters in the second password,
access to the service being prevented based on determining that the second device is not located at the geographic location at the particular time.

8. The method of claim 1, where the algorithm uses at least one of a random key generator, a hash-based message authentication code (HMAC) algorithm, a time-based one-time password (TOTP) algorithm, or an HMAC-based one-time password algorithm (HOTP).

9. A first device comprising:
one or more processors to:
receive a first password from a second device,
the first password being generated based on information identifying a geographic location, information identifying a particular time at which the second device was at the geographic location, and an algorithm;
receive, from a location information repository, the information identifying the geographic location and the information identifying the particular time at which the second device was at the geographic location;
provide the information identifying the geographic location and the information identifying the particular time to a third device;
receive, from the third device, a second password based on providing the information identifying the geographic location and the information identifying the particular time;
determine that the second device is located at the geographic location at the particular time when characters in the first password match characters in the second password;
determine a verification level based on a quantity of characters in the first password that match characters in the second password;
select a service based on the verification level; and
provide the service based on selecting the service and determining that the second device is located at the geographic location at the particular time.

10. The first device of claim 9, where when providing the service, the one or more processors are to authorize the second device to access content or to provide an indication that identifies that the second device is located at the geographic location.

11. The first device of claim 9, where the one or more processors are further to:
determine that the first device is to provide the service when the geographic location is authorized,
where when providing the service, the one or more processors are to provide the service based on determining that the first device is to provide the service when the geographic location is authorized.

12. The first device of claim 9, where when providing the information identifying the geographic location and the information identifying the particular time, the one or more processors are to:
provide the information identifying the geographic location and the information identifying the particular time based on receiving the information identifying the geographic location.

13. The first device of claim 9, where when providing the information identifying the geographic location and the information identifying the particular time, the one or more processors are to:
provide the information identifying the geographic location and the information identifying the particular time to cause the third device to use the information identifying the geographic location and the information identifying the particular time to form the second password and provide the second password to the first device.

14. The first device of claim 9, where the one or more processors are further to:
determine that the second device is not located at the geographic location at the particular time when characters in the first password do not match characters in the second password,
access to the service being prevented based on determining that the second device is not located at the geographic location at the particular time.

15. The first device of claim 9, where the algorithm uses at least one of a random key generator, a hash-based message authentication code (HMAC) algorithm, a time-based one-time password (TOTP) algorithm, or an HMAC-based one-time password algorithm (HOTP).

16. A non-transitory computer-readable medium for storing instructions, the instructions comprising:
a plurality of instructions which, when executed by one or more processors associated with a first device, cause the one or more processors to:
receive a first password from a second device,
the first password being generated based on first location information identifying a geographic location of the second device, first time information identifying a particular time at which the second device was at the geographic location, and an algorithm;
receive, from a device separate from the second device, second location information identifying the geographic location of the second device and second time information identifying the particular time at which the second device was at the geographic location;
determine a second password based on the second time information, the second location information identifying the geographic location of the second device, and the algorithm,
the algorithm using at least one of a random key generator, a hash-based message authentication code (HMAC) algorithm, a time-based one-time password (TOTP) algorithm, or an HMAC-based one-time password algorithm (HOTP);

determine whether the second device is located at the geographic location at the particular time based on whether characters in the first password match characters in the second password; and selectively:
provide a service based on determining that the second device is located at the geographic location at the particular time; or prevent access to the service based on determining that the second device is not located at the geographic location at the particular time.

17. The non-transitory computer-readable medium of claim 16, where one or more instructions, of the plurality of instructions, to provide the service, cause the one or more processors to:

authorize the second device to access content or to provide an indication that identifies that the second device is located at the geographic location at the particular time based on determining that the second device is located at the geographic location at the particular time.

18. The non-transitory computer-readable medium of claim 16, where the plurality of instructions further cause the one or more processors to:

determine a verification level based on a quantity of characters in the first password that match characters in the second password; and select a particular service based on the verification level, where one or more instructions, of the plurality of instructions, to provide the service, cause the one or more processors to provide the service further based on selecting the particular service.

19. The non-transitory computer-readable medium of claim 16, where one or more instructions, of the plurality of instructions, to determine the password, cause the one or more processors to:

use the second time information and the second location information identifying the geographic location to form the second password.

20. The non-transitory computer-readable medium of claim 16, where the plurality of instructions further cause the one or more processors to:

determine that the second device is not located at the geographic location at the particular time when characters in the first password do not match characters in the second password, access to the service being prevented based on determining that the second device is not located at the geographic location at the particular time.

\* \* \* \* \*

UNITED STATES PATENT AND TRADEMARK OFFICE
CERTIFICATE OF CORRECTION

PATENT NO. : 9,178,877 B1
APPLICATION NO. : 14/036815
DATED : November 3, 2015
INVENTOR(S) : Srikanth Prabhu Koneru It is certified that error appears in the above-identified patent and that said Letters Patent is hereby corrected as shown below:

Column 20, line 7, Claim 18, after "provide the service" remove -- further --.

Signed and Sealed this
Twelfth Day of July, 2016

Michelle K. Lee
*Director of the United States Patent and Trademark Office*